US012025188B1

(12) United States Patent
Abate et al.

(10) Patent No.: US 12,025,188 B1
(45) Date of Patent: Jul. 2, 2024

(54) ACTUATOR ENCODER ASSEMBLY METHOD AND APPARATUS

(71) Applicant: Agility Robotics, Inc., Tangent, OR (US)

(72) Inventors: Andy Abate, Tangent, OR (US); Dylan Thrush, Tangent, OR (US)

(73) Assignee: Agility Robotics, Inc., Tangent, OR (US)

( * ) Notice: Subject to any disclaimer, the term of this patent is extended or adjusted under 35 U.S.C. 154(b) by 503 days.

(21) Appl. No.: 17/492,067

(22) Filed: Oct. 1, 2021

(51) Int. Cl.
| | |
|---|---|
| *F16D 1/06* | (2006.01) |
| *B23P 21/00* | (2006.01) |
| *B25J 13/08* | (2006.01) |
| *G01D 5/26* | (2006.01) |

(52) U.S. Cl.
CPC ............... *F16D 1/06* (2013.01); *B23P 21/00* (2013.01); *B25J 13/088* (2013.01); *G01D 5/26* (2013.01); *F16D 2250/0084* (2013.01); *F16D 2300/18* (2013.01)

(58) Field of Classification Search
CPC .......... B23P 21/00; B25J 13/088; B25J 21/00; F16D 1/06; F16D 2250/0084; F16D 2300/18
USPC ....................................................... 310/12.19
See application file for complete search history.

(56) References Cited

U.S. PATENT DOCUMENTS

| | | | | |
|---|---|---|---|---|
| 11,504,778 | B2* | 11/2022 | Schaaf | B23B 49/005 |
| 11,536,318 | B1* | 12/2022 | Bauer | F16C 35/063 |
| 11,918,213 | B2* | 3/2024 | Shelton, IV | A61B 34/35 |
| 2013/0257230 | A1 | 10/2013 | Park et al. | |
| 2017/0143350 | A1* | 5/2017 | Burke | A61B 17/1631 |
| 2018/0014862 | A1* | 1/2018 | Raina | A61B 17/708 |
| 2018/0132850 | A1* | 5/2018 | Leimbach | A61B 17/07207 |
| 2018/0161124 | A1* | 6/2018 | Huwais | A61C 3/00 |
| 2018/0163617 | A1* | 6/2018 | Merritt | F01D 11/005 |
| 2019/0262848 | A1* | 8/2019 | Dolezal | B05B 7/02 |
| 2020/0247236 | A1* | 8/2020 | Hirao | B60K 17/046 |
| 2020/0275928 | A1* | 9/2020 | Shelton, IV | A61B 17/07207 |
| 2020/0282530 | A1* | 9/2020 | Sharifi-Mehr | A61B 17/8888 |
| 2020/0361573 | A1* | 11/2020 | Stacey | B63B 83/00 |
| 2021/0121939 | A1* | 4/2021 | Simpson | B21J 15/105 |
| 2021/0131565 | A1* | 5/2021 | Scheer | F16J 15/3284 |
| 2022/0218344 | A1* | 7/2022 | Leimbach | A61L 2/07 |
| 2022/0218382 | A1* | 7/2022 | Leimbach | B25F 5/00 |
| 2023/0355238 | A1* | 11/2023 | Shelton, IV | A61B 17/07207 |

FOREIGN PATENT DOCUMENTS

WO  2021/030263 A1  2/2021

* cited by examiner

*Primary Examiner* — Rashad H Johnson

(57) ABSTRACT

An actuator includes a housing having an input shaft, a transmission, an output shaft, a shaft collar assembly, and an encoder. The shaft collar assembly has an annular body for holding an encoder target and a fastening assembly for affixing the assembly to the output shaft. The location of the encoder target can be adjusted during assembly via an internal bore so that it is in a desired position relative to an encoder sensor when assembly is complete.

30 Claims, 6 Drawing Sheets

ACTUATOR ENCODER ASSEMBLY METHOD AND APPARATUS

FIELD OF THE INVENTION

The disclosed subject matter relates generally to apparatus, methods, and systems for installing encoders in actuators. More specifically, the disclosed subject matter relates to a shaft collar, an actuator with a shaft collar, and a method for installing shaft collars into actuators to produce a precise gap between encoder sensors and targets within such actuators.

BACKGROUND OF THE INVENTION

An actuator is a device that causes motion, including linear motion or rotary motion. Actuators are commonly used in robots to move the robot joints. In such actuators, it is very important to know the relative position and/or location of an end-effector of the robot so that useful work can be done in the robot's environment. The robotic system needs to be able to appropriately direct the actuator to hold the end-effector in a particular position and/or at a desired location, or to apply a desired force.

Actuators contain electric motors that are connected to input shafts that spin at a high rate of speed with very low torque. The input shafts are, in turn, connected to a transmission, such as a cycloid transmission, that typically reduces rotational speed while increasing torque to an output shaft. The output shaft is then used to manipulate the arms and legs of the robot. In order for the robot limb to move to a desired location (i.e. be useful), encoders are used on both the input shaft and the output shaft so that the appropriate power can be applied to the motor at the appropriate time to accomplish a desired task.

Unfortunately, during the assembly of the actuator, encoder sensors can be positioned too far or too close to the sensor target, so that the sensor does not accurately record the position of input or output shaft. This is often the result of a stack-up of part sizing tolerances that can cause an encoder target to be outside the desired range of distance from the encoder sensor when the actuator assembly is complete. This disparity can cause the speed and the position of robot extremities to be unknown by the system or different than intended, such that the movement of the robot is inefficient. Accordingly, there is a need to ensure that the space between the sensor and the target are within an operational range for the encoder in every actuator.

SUMMARY OF THE INVENTION

The following summary is provided to introduce a selection of concepts in a simplified form that are further described below in the detailed description. This summary is not intended to identify key features or essential features of the claimed subject matter, nor is it intended to be used to limit the scope of the claimed subject matter.

The disclosed subject matter relates to an actuator. The actuator has a housing, an input shaft, a transmission, and an output shaft therein. A shaft collar assembly has an annular body that slides on the output shaft for holding the output encoder target. The annular body has an internal bore for receiving the output shaft, at least partially, extending therethrough and a hole in fluid communication with the internal bore to define a passageway. A position measurement system, such as an encoder with a sensor for detecting the encoder target is mounted on the housing. A fastener engagingly inserts into the passageway, on the shaft collar, at least partially, via the internal bore to engage the annular body to grip the output shaft to hold the shaft collar assembly, and thus the target, at a desired distance from the sensor, thereby defining a precise gap.

In another embodiment, an adjustable shaft collar assembly for installation on a driveshaft at a desired position is provided. An annular shaft collar body has a flange with a gripping surface thereon. The annular body defines an internal bore extending therethrough along a center axis and a hole through the annular body in fluid communication with the internal bore to form a passageway therein. A fastener inserts through the internal bore into the passageway, at least partially. The internal bore receives the driveshaft therein with the driveshaft being substantially aligned with the center axis, so that the tubular body is slidable to the desired position. The fastener inserts through the internal bore into the passageway, at least partially, so that the fastener engages the annular body to clamp the gripping surface against the driveshaft to hold the shaft collar assembly at the desired position.

In yet another embodiment, a method for ensuring a desired spatial relationship between an encoder sensor and target in an actuator having an output shaft extending along a longitudinal axis in the actuator is provided. A jig connects to a mounting surface on an actuator housing and a shaft collar assembly is positioned on the output shaft so that it abuts the jig. The shaft collar assembly slides onto the output shaft, causing the shaft collar assembly and the output shaft to be aligned along the longitudinal axis, the position of the shaft collar assembly being adjustable along the longitudinal axis. A fastener inserts into the shaft collar assembly via the internal bore to clamp the shaft collar assembly in place against the output shaft, thereby fixing the shaft collar assembly in a set position. The jig is removed and the encoder sensor is installed in its place, resulting in the sensor and target being a desired distance away from each other within the actuator.

These and other features and advantages will be apparent from a reading of the following detailed description and a review of the appended drawings. It is to be understood that the foregoing summary, the following detailed description and the appended drawings are explanatory only and are not restrictive of various aspects as claimed to eliminate these inefficiencies.

BRIEF DESCRIPTION OF THE DRAWINGS

For a fuller understanding of the nature and advantages of the disclosed subject matter, reference should be made to the following detailed description, taken in connection with the accompanying drawings, in which.

DETAILED DESCRIPTION OF THE DRAWINGS

Figure 1:
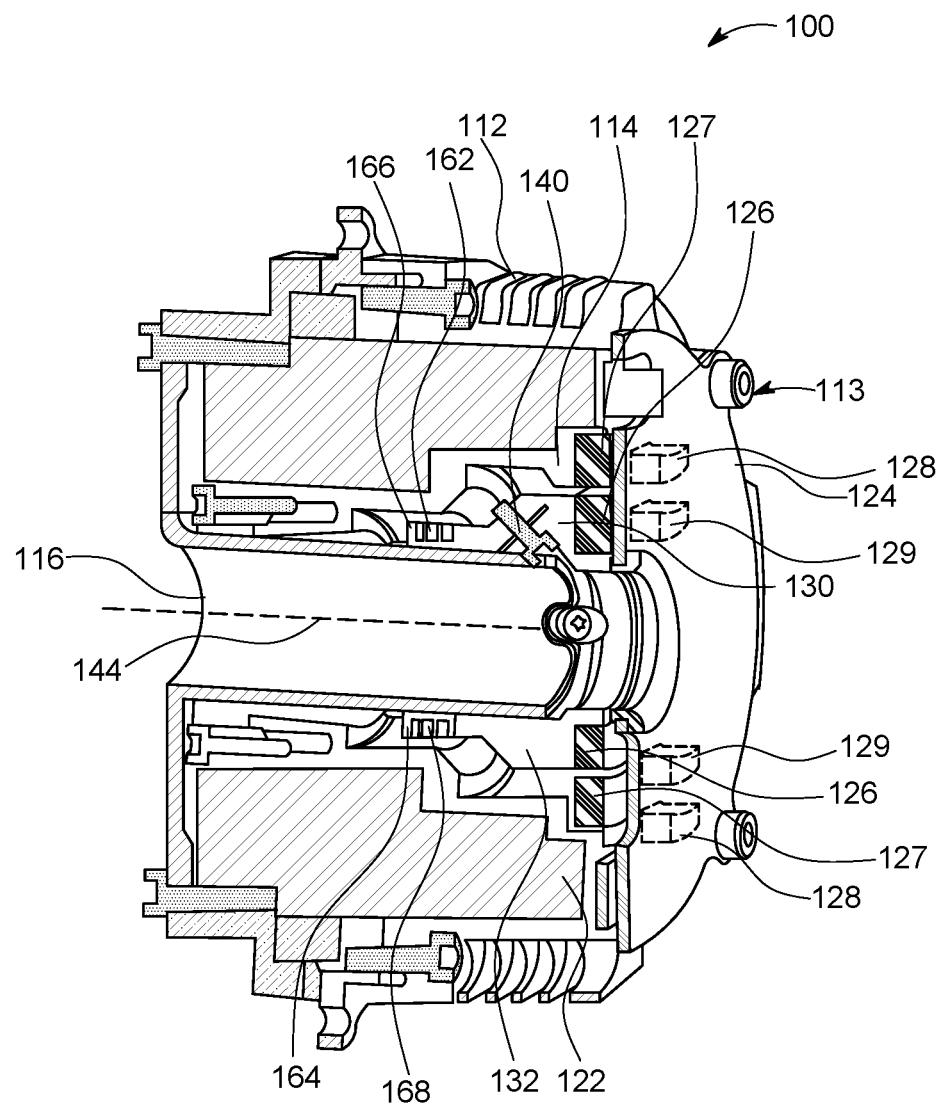
FIG. 1 is a cross-sectional view of an actuator in accordance with an embodiment of the disclosed subject matter.

The following detailed description includes the best currently contemplated modes of carrying out exemplary embodiments of the invention. The description is not to be taken in a limiting sense, but is made merely for the purpose of illustrating the general principles of the invention.

In the following description, for purposes of explanation, numerous specific details are set forth in order to provide a thorough understanding of example embodiments. It will be evident to one skilled in the art, however, that embodiments can be practiced without these specific details. In some instances, well-known methods or components have not been described in detail so that the details of the present invention are not obfuscated.

In the interest of clarity, some routine features of the implementations described herein are omitted. It will be appreciated that in the development of any actual implementation of the present invention, certain decisions must be made in order to achieve specific goals, and that different decisions can be made to achieve different goals without departing from the teachings of the invention. While certain implementations might be complex and time-consuming, they would nevertheless be routine to accomplish for those of ordinary skill in the art having the benefit of this disclosure The disclosed subject matter is directed to an actuator that can be particularly adapted for use in robots and/or robotic systems. The actuator can cooperate with other actuators in the robot and/or robotic systems to enable movement of robotic members, such as arms and/or legs, in their environment. In such applications, an output shaft can be used to manipulate the arms and legs of a robot to provide the robot with the ability to move to a desired location (i.e. be useful).

Sensor assemblies that function as position measurement systems can communicate with motors in the actuators to control the movement of the robotic members. The sensor assemblies can include encoder sensors that measure the position of a target that has a fixed relation to an output shaft or an input shaft. If the encoder sensor is too far or too close to the sensor target, it will not accurately record the position of input or output shaft resulting in the robot members moving at an incorrect speed and/or being at an incorrect speed.

The problem can be compounded by the tolerances of the various parts that are used to assemble the actuator. The actuator can utilize a shaft collar assembly having an annular shaft collar that can be installed around an output driveshaft or output shaft at a precise position.

Shaft collars are ring-shaped plastic or metal devices that clamp around a shaft. In general, shaft collars hold motor components, gear assemblies, sprockets, bearings, and other parts in place and sometimes facilitate their proper movement. The collars can specifically locate components, keep them appropriately spaced, or limit their movement. Shaft collars can also be used to connect one end of the shaft itself to a part or surface.

The simplest shaft collars use set screws that tighten into the shaft to hold the collar in place. While these collars still see some use, the screws tend to mar the shaft which makes it difficult to remove and reposition the collars. Most modern shaft collars use a clamp that holds to the shaft. Clamp screws tighten the clamp around the shaft without the need to dig into the shaft itself. Unfortunately, the existing art suffers from the problem that there's a lack of space to access the screw or fastener from the outside of the actuator, so it's problematic to tighten the fastener when all the parts are in place.

The annular shaft collar assembly that is the subject of this disclosure can include a jig that can be removed after the annular shaft collar assembly is installed in the actuator. The jig can be replaced by the sensor assembly, which will hold one or more sensors at a predetermined, repeatable distance from a target. The spatial relationship between the sensors and the target represent a precise air gap between the two components, which will remain constant regardless of the tolerances of the rest of the parts of the actuator assembly.

Now referring to FIGS. 1-6, an actuator, generally designated by the numeral 100, is shown. The actuator 100 can be used in a robot or robotic system to position and/or locate as desired a member, such as an arm, leg, or boom, or an end-effector such as a hand, finger, or drill. The actuator 100 includes a transmission and has a housing 112, an input shaft 114, and an output shaft 116 coupled with the input shaft 114, such that rotation of the input shaft 114 causes the output shaft 116 to rotate. The output shaft 116 is mounted in the housing 112 and connects to a gearhead and an output bearing. The housing 112 can be a frame, a chassis, or other similar structure.

The actuator 100 also includes a motor 122 that is mounted inside the housing 112 and coupled directly to the input shaft 114. The housing 112 is mountable to or integrated with another component of a robot, such as a chassis or body. When the motor is powered, a rotor rotates therein. This causes the input shaft 114 to rotate, which, in turn, causes the output shaft 116 to rotate via the transmission.

When fully assembled, as shown in FIG. 1, the actuator 100 includes a sensor assembly 124 disposed on a first end 113 of the actuator 100, the first end 113 forming a plurality of substantially planar mounting surfaces for receiving the sensor assembly 124, an output shaft target 126 that rotates about a longitudinal axis 144 with the output shaft and an input shaft target 127 that rotates about the longitudinal axis 144 with the input shaft. The sensor assembly 124 is substantially planar and shaped to be installed on the mounting surfaces at the first end 113 of the housing 112 and can include at least an input target sensor 128 and an output target sensor 129 that are oriented on the sensor assembly 124 to read the speed of the shafts 114, 116 by detecting the rotation of the targets 126, 127. In this manner, the sensor assembly 124 and the targets 126, 127 form a position measurement system. The targets 126, 127 can be mounted on each shaft 114, 116 or at a fixed distance from them, such as on a shaft collar assembly 130, which provides the sensor assembly 124 with the ability to determine their position though the sensors 128, 129. The sensor assembly 124 can communicate the position of the shafts 114, 116 to a motor controller, so that the amount of power/torque that is transmitted to the output shaft 116 can be measured and controlled.

As shown in FIGS. 1-6, the shaft collar assembly 130 can connect to the output shaft 116. The shaft collar assembly 130 can include a shaft collar body 132 that includes an internal bore 134 that extends therethrough. The shaft collar assembly 130 can receive the output shaft 116 in the internal bore 134.

The shaft collar body 132 can include at least one passageway 138 that is in fluid communication with the internal bore 134. A fastener 140 can be inserted through the internal bore 134 into the passageway 138, at least partially, so that the shaft collar assembly 130 can be tightened around the output shaft 116 from the inside diameter of the output shaft 116.

Figure 2:
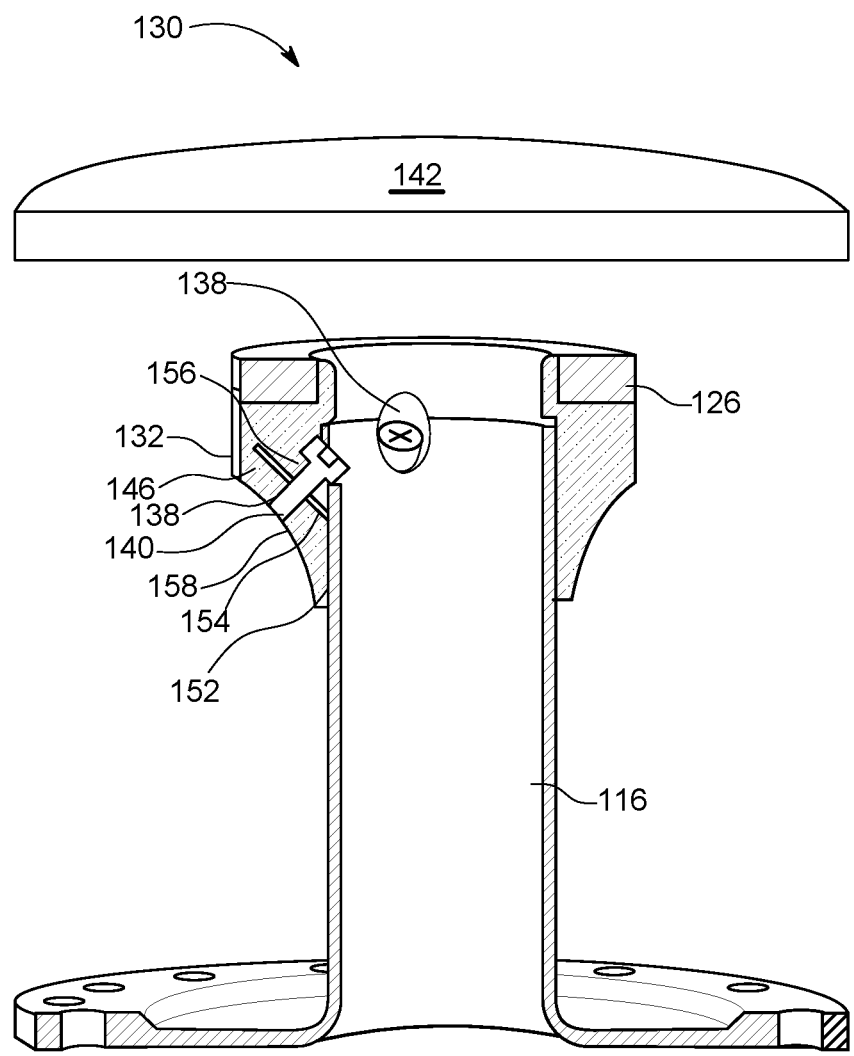
FIG. 2 is a cross-sectional view of an isolated shaft collar assembly mounted on an output shaft and a jig in accordance with an embodiment of the disclosed subject matter.
Figure 3:
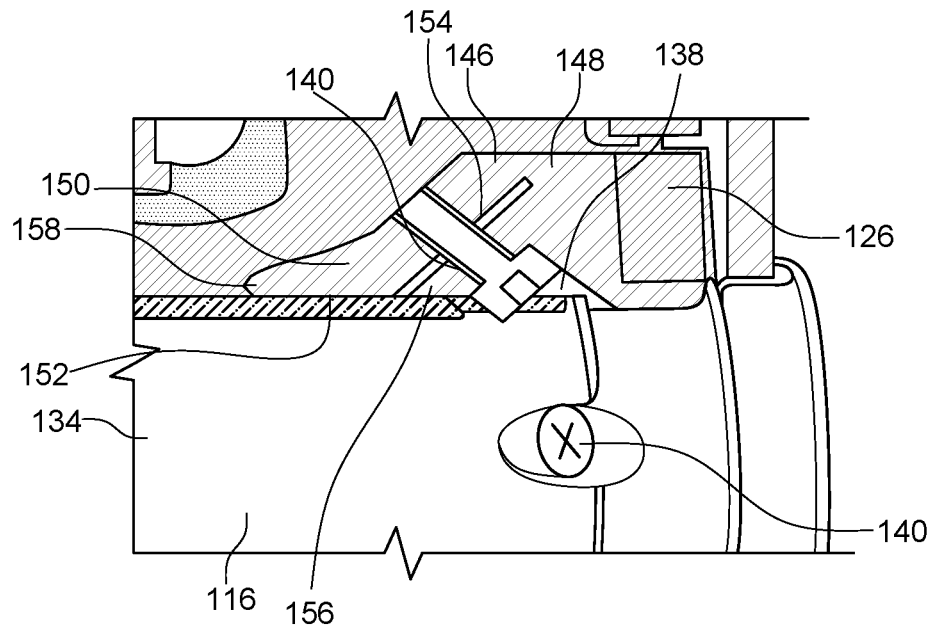
FIG. 3 is a fragmentary cross-section view in side elevation of a portion of the shaft collar assembly installed in the actuator shown in FIG. 1.
Figure 4:
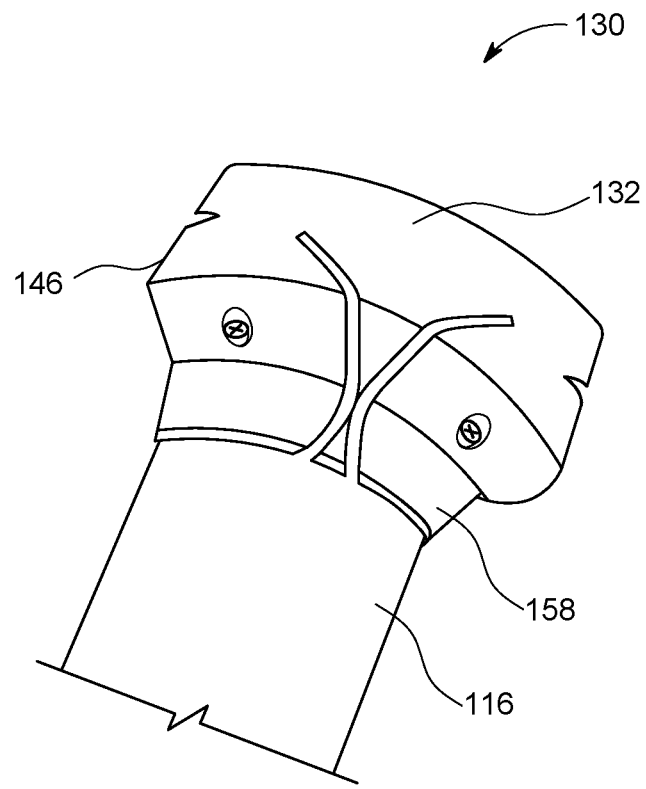
FIG. 4 is a fragmentary perspective view of a shaft collar assembly in accordance with certain embodiments of the disclosed subject matter.
Figure 5:
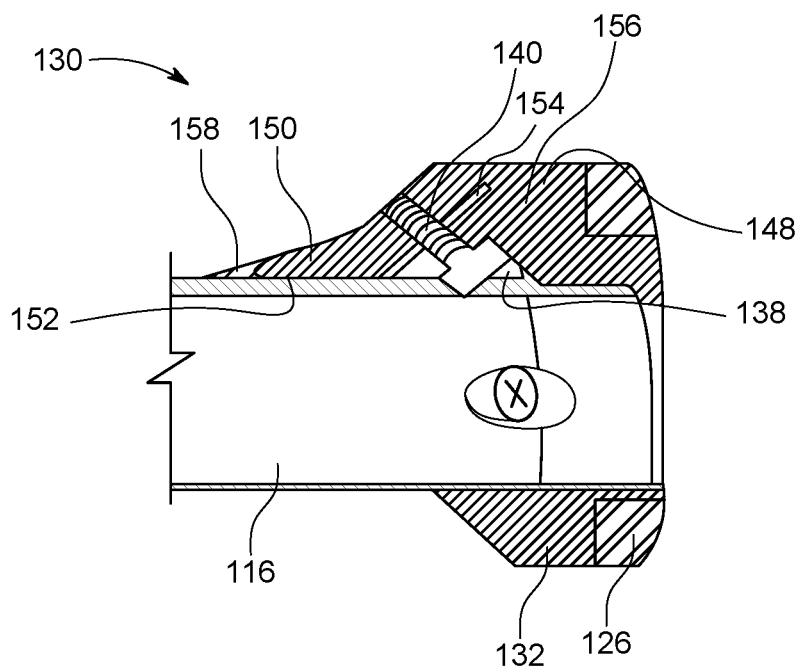
FIG. 5 is a fragmentary cross-section view in side elevation of the shaft collar assembly shown in FIG. 4.
Figure 6:
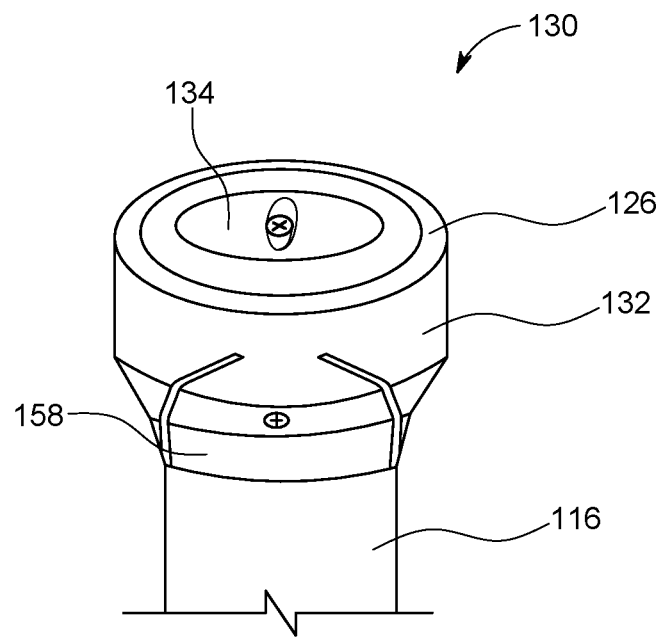
FIG. 6 is a fragmentary perspective view of the shaft collar assembly shown in FIG. 4.

The fastener 140 engages the body 132 to grip the output shaft 116 to hold the output shaft target 126 at a predetermined distance from sensor 129, which defines a precise gap between the sensor assembly 124 and the target 126. As shown in FIG. 2, the shaft collar assembly 130 can be installed with a jig 142 that has preselected dimensions to facilitate the positioning of the body 132 on the output shaft 116. In an embodiment, the jig 142 is configured to be installed in the place of the sensor assembly 124 and sized so that snugging the output shaft target 126 against the jig 142 before tightening the shaft collar assembly 130 on the output shaft 116 will result in the desired spacing when the jig 142 is removed and the sensor assembly 124 is installed in its place.

The fastener 140 can be one of a plurality of fasteners that can be inserted through the output shaft internal bore 134 to engage the output shaft 116 to hold the shaft collar body 132 in a desired position. The fastener 140 can be tightened with a screwdriver, a torx, or other similar tools. Upon tightening, the body 132 engages the output shaft 116, which fixes the body 132 in place in a precise position on the output shaft 116. The fastener 140 can be a threaded fastener, such as a screw or a bolt.

As shown in FIGS. 1-6, the output shaft 116 and the body 132 are substantially cylindrical and are aligned along a common longitudinal axis 144 in the housing 112, so that the body 132 forms an annular ring around the output shaft 116. The body 132 can include a flexible cover 146 extending from the top 148 of the body 132.

The cover 146 can include an annular flange 150 extending therefrom. The flange 150 can include a gripping surface 152 thereon. A channel 154 can separate the flange 150 from an inner ring 156 on the body 132. In this exemplary embodiment, the hole 136 extends through the channel 154 into cover 146, so that the fastener 140 can engage the cover 146 to move the gripping surface 152 to clamp down and to grip the output shaft 116.

The cover 146 can be pivotally connected to the inner ring 156, so that a protruding member 158 on the flange 150 can be moved and/or deformed to frictionally engage the gripping surface 152 with output shaft 116. In this exemplary embodiment, the cover 146 is elastic, so that it is not deformed permanently when the gripping surface 152 engages the output shaft 116.

As shown in FIG. 1, the position measurement system or sensor assembly 124 includes a printed circuit board. The sensors 128, 129 can be magnetic sensors. The sensor assembly 124 can include encoders, magnetic code carriers and/or integrated circuits that integrate the sensors 128 for signal scanning, signal conditioning, and interpolation.

Multiple sensors can be arranged in concentric patterns matched to each target 126, 127 in order to provide redundancy and continuous error correction. The concentric arrangement of the input and output sensors is valuable because you can shorten the overall length of the actuator.

As shown in FIGS. 1-6, the jig 142 can be used during the shaft collar assembly 130 installation process to ensure that a precise gap is formed between the output shaft target 126 and the output target sensor 129. The gap can be set precisely regardless of the tolerances of the rest of the parts of the actuator 100.

In an embodiment, the jig 142 can be installed on the first end 113 of a partially-assembled actuator 100 in place of the sensor assembly 124. To set the precise gap between the output shaft target 126 and the output target sensor 129, the body 132 can be slid or otherwise moved longitudinally along the output shaft, closer to or further from the eventual location of the output target sensor 129 and tightened against the output shaft 116 when it is positioned at the desired distance. In certain embodiments, the jig 142 is sized such that when the shaft collar body 132 is positioned so that it is touching the jig 142, it is in the desired position so that when the jig 142 is removed and the sensor assembly 124 is installed, the proper gap between the sensors and the targets will be achieved. In further embodiments, the jig 142 has a thickness that extends from the planar mounting surface into the housing in an amount that is substantially equal to the desired distance between the output target sensor 129 and the output shaft target 126.

Once the body 132 has been secured on the output shaft, the jig 142 can be removed and replaced with the sensor assembly 124. Through the use of the shaft collar assembly 130 and, specifically, the jig 142, the installation process can be controlled in a repeatable way to greatly reduce the negative effects of engineering tolerances for the various parts within the actuator 100.

As illustrated in FIG. 1, the positioning of the shaft collar assembly 130 can be facilitated with biasing member assembly 162. The biasing member assembly 162 can include a tubular housing 164 having a flange 166 and a biasing member 168 for holding the body 132 in a biased position as the shaft collar assembly 130 is being installed in the actuator 100. In an embodiment, the biasing member 168 is a spring.

The biasing member 168 can be configured to bias the body 132 toward the desired position for the sensor assembly 124, so that the jig 142 can exert force against the body 132 to ensure proper location of the outer shaft target 126 in relation to the outer shaft sensor 129 when the jig 142 is removed and the sensor assembly 124 is installed. In embodiments, the jig 142 is sized so that when the shaft collar body 132, which holds the outer shaft target 126, is pressed against installed jig 142, the desired location is achieved. Through this action, the biasing member 168 helps ensure that there is a correct gap between the outer shaft target 126 and the outer shaft sensor 129 when the jig 142 is replaced by the sensor assembly 124.

Figure 7:
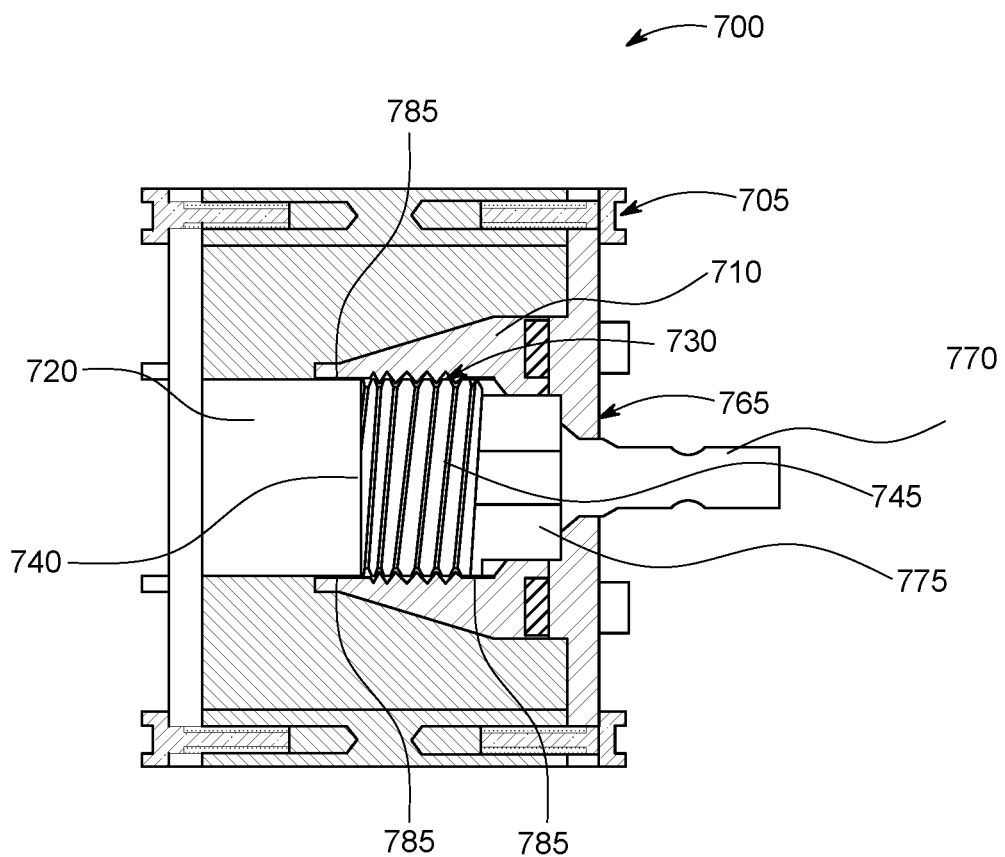
FIG. 7 is a fragmentary cross-section view in side elevation of an embodiment of the shaft collar assembly of the present invention.

With reference to FIG. 7, a partial cross-section view of an additional embodiment of a partially assembled actuator 700 having a shaft collar 710 engaged with an output shaft 720 to enable proper target to sensor gapping is illustrated. The actuator 700 is referred to as partially assembled because a jig 760 has been installed on a first end 705 of the actuator in the location where a sensor assembly will ultimately be located. The jig 760 forms a cutout 765 that enables an install tool 770 to be inserted into the actuator 710 for purposes of adjusting the height of the shaft collar 710 on the output shaft 720 during installation. As with previously-described embodiments, an output shaft target 750 is mounted on the shaft collar 710 so that it can be read by sensors when a sensor assembly (not shown) is installed to determine the speed at which the output shaft 720 is spinning during operation.

In embodiments, the shaft collar 710 is annular and forms an internal bore to receive the output shaft. The internal bore of the shaft collar 710 has an inner surface 730 that engages with an outer surface 740 of the output shaft 720. In embodiments, the inner surface 730 engages with a portion of the outer surface 740 via screw threads 745 whereby the shaft collar 710 can be adjusted axially in relation to the output shaft 720 during assembly of the actuator 700.

Another portion of the internal bore of the shaft collar 710 has an engagement feature 780 shaped to be engaged by the install tool 770 so that the shaft collar 710 can be advanced on the screw threads 745, thus causing the shaft collar 710 to move on the output shaft 720 to be closer or farther away from the jig 760, which is a proxy for the later-installed sensor assembly. In embodiments, the engagement feature 780 is a star drive interface.

In certain embodiments, the screw threads 745 are left-handed threads for ease of assembly. It is a general convention that screws are generally advanced when rotated in a clockwise direction. In some embodiments, however, the install tool 770 is inserted into the partially assembled actuator 700 from the first end 705 and it is desired that the shaft collar 710 advance toward the jig 760 instead of away. In still other embodiments, the shaft collar 710 is advanced against the jig using a torque wrench set to a maximum torque of one half newton meter.

Figure 7A:
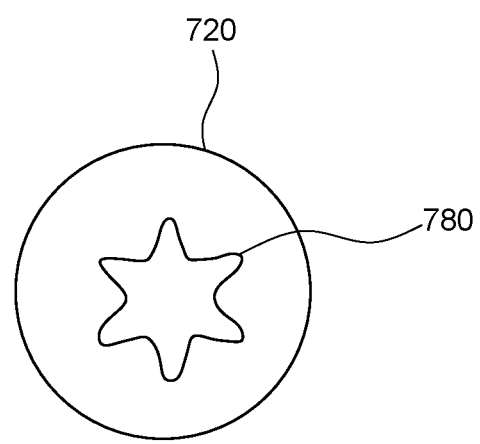
FIG. 7a is a plan view of an embodiment of a shaft collar of the present invention.

FIG. 7a is a plan view of the portion of the shaft collar 710 located at the first end 705 of the actuator. The install tool 770 has a keying feature 775 that matches the engagement feature 780 to adjust the height of the shaft collar on the output shaft 720. When the shaft collar 710 is in the proper location, a thread locker may be used to permanently affix the shaft collar to the output shaft 720.

In embodiments, the shaft collar 710 also has concentricity features 785 that ride on the output shaft 720 to keep the shaft collar 710 from rocking or moving off-center. If the shaft collar loses concentricity, the sensor targets 750 may no longer work with the sensor assembly properly. In some embodiments, the concentricity features 785 are located on both sides of the screw threads 745.

In still further embodiments, the threads on the output shaft 720 are a combination of a lead screw and a linear bearing. In other embodiments the threads are like those of a glide screw. In this way, the threads further act to keep the shaft collar 710 concentric on the output shaft 720.

Figure 8:
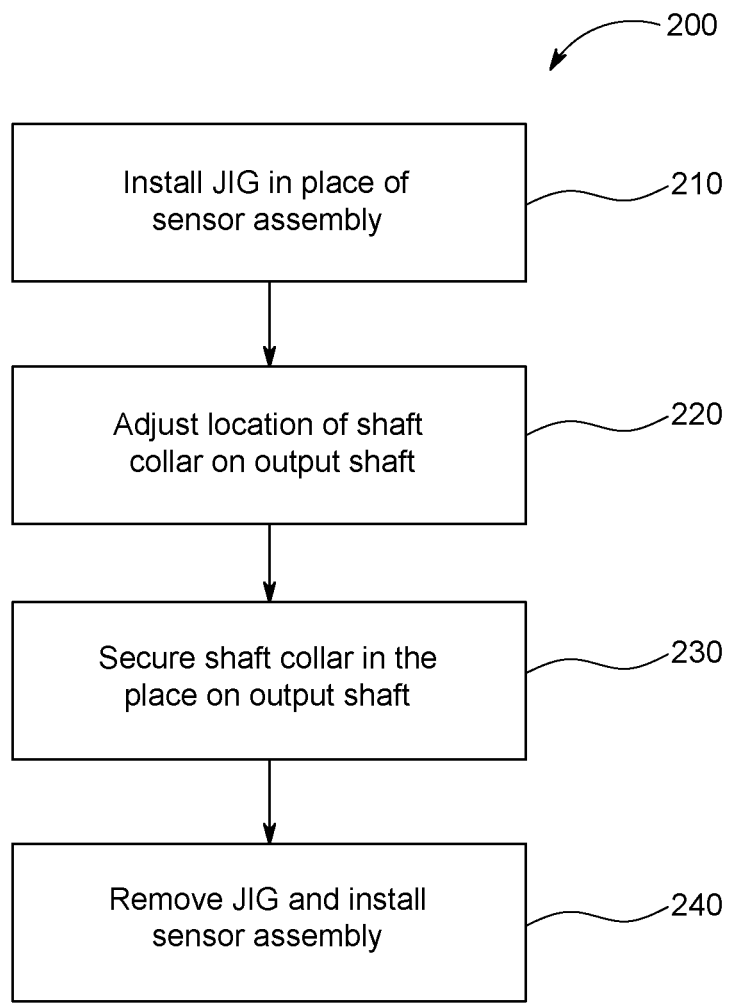
FIG. 8 is a flow chart describing a method of installing a shaft collar assembly to produce a precise gap between a sensor and a target in the actuator shown in FIG. 1.

Now referring to FIG. 8, a method 200 can be employed to ensure a desired gap between the sensors and the targets in an actuator. The actuator, the target, and the sensors can be the actuator 100, the targets 126, 127, and the sensors 128, 129 shown in FIGS. 1-6. Like the embodiments shown in FIGS. 1-7, the actuator that is the subject of the method 200 can include an output shaft, like output shaft 116 or 720, extending along a longitudinal axis, such as the longitudinal axis 144.

The method 200 comprises installing a jig on a first end of a partially assembled actuator at step 210, the jig being sized and shaped to be installed in the same place that the sensor assembly will later be installed. In certain embodiments, the jig is formed with a central cutout that, when installed, lines up with the internal bore through the output shaft to enable access into the actuator while the jig is installed. A portion of the jig extends into the actuator and toward the shaft collar assembly in order to assist with output shaft target placement. Like the embodiments shown in FIGS. 1-6, the shaft collar assembly can be the shaft collar assembly 130, the bore can be the bore 134, and the jig can be the jig 142, the output shaft can be output shaft 116. FIG. 7 does not show the bore, but does show shaft collar 710, jig 760, and output shaft 720.

Next, at step 220, the position of the shaft collar assembly that holds the output shaft target is adjusted until it is in the desired position on the output shaft. In embodiments, the desired position is achieved when the shaft collar assembly is moved axially until it contacts the jig. In some embodiments, biasing members cause the shaft collar assembly to press against the jig. In other embodiments, an install tool is used to advance the shaft collar toward the jig until it touches. Like the embodiments shown in FIGS. 1-7, the shaft collar assembly can be shaft collar assembly 130 or 710, the jig can be jig 142 or 760, the output shaft can be output shaft 116 or 720, the biasing members can be biasing member 168, and the install tool can be install tool 770.

Once the shaft collar assembly is in the desired position, Step 230 secures the shaft collar assembly in place on the output shaft. In an embodiment, this can be accomplished by tightening a fastener via the internal bore to clamp the shaft collar assembly to the output shaft. In certain embodiments, the fastener can be fastener 140 shown in FIGS. 1-6. In another embodiment, such as the configuration illustrated by FIG. 7, a thread locking adhesive can be applied to the threads so that the shaft collar assembly is immobilized.

Next, the jig is removed at Step 204 and replaced with a sensor assembly that includes one or more sensors. In embodiments, the sensor assembly, the target, and the sensors can be sensor assembly 124, target 126 or 750, and sensor 129.

While specific embodiments of the invention have been described in detail, it should be appreciated by those skilled in the art that various modifications and alterations could be developed in light of the overall teachings of the disclosure. Accordingly, the particular arrangements, apparatuses, systems, and methods disclosed are meant to be illustrative only and not limiting as to the scope of the invention.

The invention claimed is:

1. An actuator comprising:
   a housing having a first end and a second end, the housing forming a mounting surface at the first end;
   an output shaft having a longitudinal axis, the shaft disposed within the housing and forming an axial passageway from the first end to the second end of the housing;
   a shaft collar assembly adjustably positionable on the output shaft, the shaft collar assembly having an output encoder target secured thereon; and
   a sensor carrier disposed on the mounting surface, the sensor carrier having an output encoder sensor disposed thereon for measuring rotation of the output shaft about the longitudinal axis.

2. The actuator of claim 1, wherein the shaft collar assembly is positioned on the output shaft so that the output encoder target is readable by the output encoder sensor.

3. The actuator of claim 1, further comprising a fastening assembly for affixing the shaft collar in a desired location on the output shaft.

4. The actuator of claim 1, wherein the shaft collar assembly further comprises an annular body having an internal bore for receiving the output shaft and a fastening assembly for securing the shaft collar assembly to the output shaft at a desired location.

5. The actuator of claim 4, wherein the fastening assembly comprises:
   one or a plurality of flanges, each having a length, each flange pivotally connected to the annular body at a first flange end and spaced from the annular body along the length to create a gap, each flange having a gripping surface engageable with the output shaft at a second flange end;

a fastener hole in fluid communication with the internal bore extending linearly through the shaft collar and into each flange; and a fastener insertionally engageable with the fastener hole whereby engagement of the fastener causes the gripping surface to grip the output shaft.

6. The actuator of claim 5, wherein the fastener is engaged via the internal bore.

7. The actuator of claim 6, wherein the fastener is threaded.

8. The actuator of claim 1, wherein the output encoder sensor is one of a plurality of sensors arranged in a concentric pattern on the sensor carrier and mounted in a plane that is substantially transverse to the longitudinal axis of the output shaft.

9. The actuator of claim 1, wherein the shaft collar assembly further comprises a biasing member for holding the shaft collar assembly in a biased position on the output shaft.

10. The actuator of claim 9, wherein the biasing member includes a spring.

11. The actuator of claim 1, wherein the output shaft has an outer surface that is threaded and the shaft collar assembly has an inner surface that is threadingly engaged with the outer surface, whereby rotation of the shaft collar in relation to the output shaft causes axial movement of the shaft collar assembly on the output shaft.

12. The actuator of claim 11, wherein the shaft collar assembly has at least two concentricity features on the inner surface to keep the shaft collar assembly properly aligned with the output shaft.

13. The actuator of claim 11, wherein the inner surface of the shaft collar assembly forms an engagement feature near the first end of the housing, whereby the shaft collar assembly can be rotated relative to the output shaft.

14. A shaft collar assembly for holding an encoder target in a desired position within an actuator, the shaft collar assembly comprising:

an annular body having an internal bore for receiving a driveshaft having an outer surface, the internal bore defining an internal surface engageable with the outer surface; the annular body further forming a receptacle for holding the encoder target;

a holding mechanism for keeping the shaft collar at the desired position on the driveshaft.

15. The shaft collar assembly of claim 14, wherein the holding mechanism further comprises a flange disposed on the annular body and pivotally spaced therefrom, the flange having an inner gripping surface adjacent to the driveshaft;

a hole formed in the annular body, the hole in fluid communication with the internal bore to form a passageway therein; and a fastener shaped to be inserted at least partially through the internal bore into the passageway, wherein the fastener engages the annular body and the flange to pull the flange closer to the annular body and clamp the gripping surface against the driveshaft, whereupon the gripping surface holds the shaft collar assembly at the desired position on the driveshaft.

16. The shaft collar assembly of claim 15, wherein the fastener is threaded and pulls the flange closer to the annular body as it is advanced in the passageway.

17. The adjustable shaft collar assembly of claim 15, wherein the fastener is one of a plurality of fasteners.

18. The shaft collar assembly of claim 14, wherein the the internal surface of the annular body and the outer surface of the driveshaft are threadedly engaged to permit axial movement of the annular body in relation to the driveshaft.

19. The shaft collar assembly of claim 18, wherein the holding mechanism is at least one of a thread locker and an adhesive spray.

20. A method for placing an encoder target in an actuator in a desired location to be read by one or a plurality of encoder sensors, the actuator having a housing forming a mounting surface for receiving an encoder sensor carrier and an output shaft disposed within the actuator and extending along a longitudinal axis in the actuator, the output shaft further having a shaft collar assembly adjustably disposed thereon, the shaft collar assembly holding the encoder target, the method comprising:

connecting a jig to the mounting surface in place of the encoder sensor carrier;

moving the shaft collar assembly along the output shaft until it contacts the jig;

affixing the shaft collar to the output shaft;

wherein the encoder target is located at the desired location.

21. The method of claim 20, further comprising removing the jig and installing the encoder sensor carrier on the mounting surface.

22. The method of claim 20, wherein the output shaft forms an axial passageway and the step of affixing the shaft collar to the output shaft further comprises tightening the shaft collar on the output shaft from within the axial passageway.

23. The method of claim 22, wherein the shaft collar assembly has an internal bore extending therethrough and the step of affixing the shaft collar to the output shaft further comprises inserting a fastener into the shaft collar assembly internal bore to clamp the shaft collar assembly against the output shaft to fix shaft collar assembly in a set position.

24. The method of claim 20, wherein the step of moving the shaft collar assembly comprises rotating the shaft collar in relation to the output shaft to advance the shaft collar assembly along a threaded pathway.

25. The method of claim 24, wherein the step of affixing the shaft collar to the output shaft further comprises applying a thread locker to the threaded pathway.

26. The method of claim 20, further comprising biasing the shaft collar assembly along the longitudinal axis.

27. A shaft collar installation kit for installing an encoder target in a desired location inside an actuator during assembly, the actuator having a housing forming a mounting surface and a rotatable output shaft, the kit comprising:

a shaft collar assembly having an annular body, the annular body forming an internal bore for adjustably receiving the output shaft, the annular body further holding the encoder target at a fixed location on the assembly; and a jig configured for temporary installation on the mounting surface, the jig having an internal surface and a cutout that, when the jig is mounted, substantially aligns with the internal bore; the jig further sized to establish the desired location for the encoder target when the shaft collar assembly is placed in contact with the internal surface.

28. The shaft collar installation kit of claim 27, further comprising an install tool shaped to engage the shaft collar assembly for rotation in relation to the output shaft, thereby adjusting the location of the assembly.

29. The shaft collar installation kit of claim 27, wherein the annular body further comprises a pivotally attached flange with a gripping surface thereon and a hole in fluid communication with the internal bore to form a passageway therein.

30. The shaft collar installation kit of claim 29, further comprising a fastener for inserting through the internal bore into the passageway, whereby the fastener engages the annular body and the flange to clamp the gripping surface against the output to hold the shaft collar assembly at the desired location.

\* \* \* \* \*